United States Patent [19]

Bejczy

[11] 4,260,187
[45] Apr. 7, 1981

[54] TERMINAL GUIDANCE SENSOR SYSTEM

[76] Inventor: Robert A. Frosch, Administrator of the National Aeronautics and Space Administration, with respect to an invention of Antal K. Bejczy, Pasadena, Calif.

[21] Appl. No.: 23,439

[22] Filed: Mar. 23, 1979

[51] Int. Cl.³ .......................... B66C 1/10; B64G 1/62
[52] U.S. Cl. .................................. 294/86 R; 244/161; 318/640; 356/152; 414/730
[58] Field of Search .......................... 244/161, 135 A; 414/730, 750; 356/4, 152; 318/580, 584, 585, 586, 640; 250/491, 551; 294/86 R, 107

[56] References Cited

U.S. PATENT DOCUMENTS

| 2,652,280 | 9/1953 | Billings .................................. 294/107 |
| 3,224,709 | 12/1965 | Blizard .................................. 244/161 |
| 3,285,533 | 11/1966 | Jernigan ................................ 244/161 |
| 3,727,055 | 4/1973 | David et al. .......................... 356/152 |
| 3,888,362 | 6/1975 | Fletcher et al. ...................... 414/730 |

Primary Examiner—Charles E. Frankfort
Attorney, Agent, or Firm—Monte F. Mott; John R. Manning; Paul F. McCaul

[57] ABSTRACT

A system is described for guiding a claw to the proper distance and into the proper orientation in yaw and pitch, to engage a grappling fixture. The system includes four proximity sensors on the claw, that are arranged at the corners of an imaginary square, which sense the distance to the top surface of the grappling fixture. If a pair of sensors at opposite corners of the square sense a different distance to the top surface of the grappling fixture, then it is known that the claw is rotated about a corresponding axis with respect to the plane of the grappling fixture.

4 Claims, 7 Drawing Figures

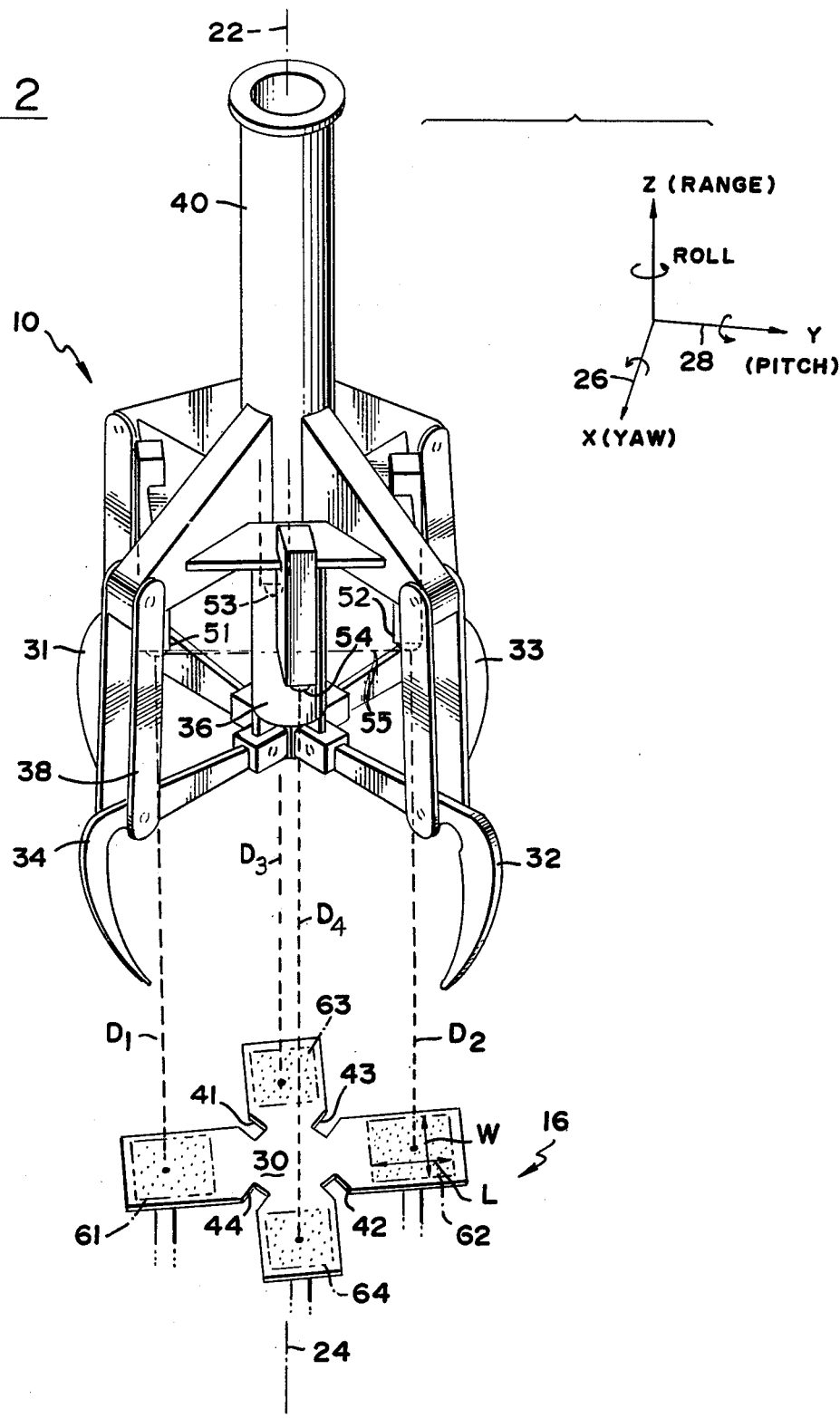

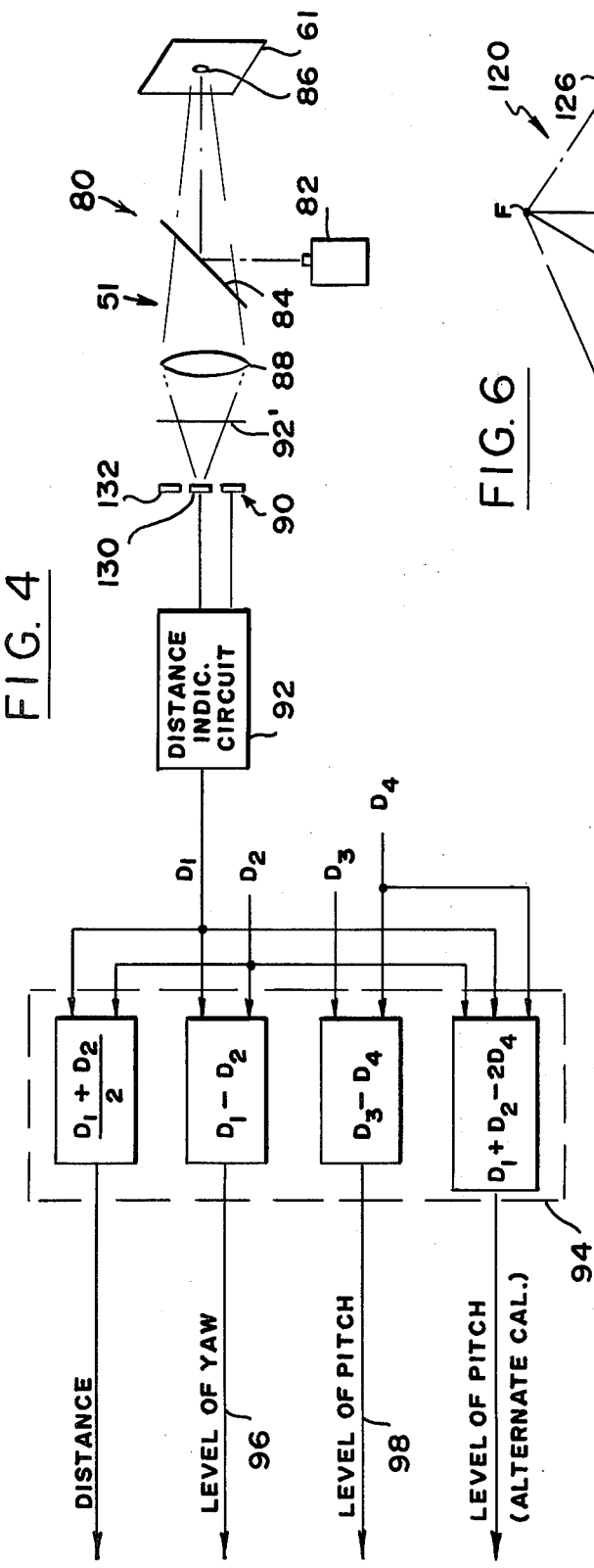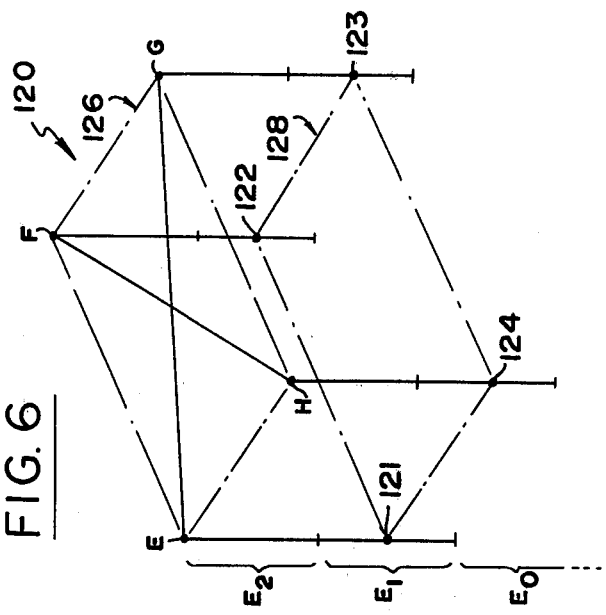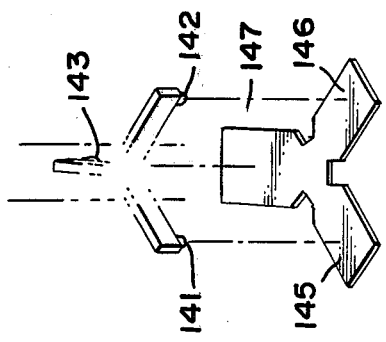

TERMINAL GUIDANCE SENSOR SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

One application in which a first element must be positioned by remote control with respect to a second element, is in the initial coupling of a pair of space vehicles, as in the initial coupling of a space shuttle to an orbiting satellite. A grappling claw lying at the end of a long manipulator boom extending from the space shuttle, is manipulated so that the claw is in line with the grappling fixture, and with the plane of the claw parallel to the plane of the grappling fixture. The claw then can approach slightly closer to the fixture and four jaws on the claw can close over four corresponding strikers on the fixtures, to securely connect the end of the boom to the fixture on the satellite. The lateral positioning of the claw substantially in line with the fixture normally can be easily accomplished as by an operator viewing them from a distance, but sensing the orientation of the claw about yaw and pitch axis and sensing distance along the line of sight, are difficult to accomplish by mere viewing from a distance. A relatively simple system for sensing the orientation and line-of-sight distance of a pair of elements would aid in the manipulation of a claw designed to grasp a fixture, as well as in other remote control applications.

SUMMARY OF THE INVENTION

In accordance with one embodiment of the present invention, a relatively simple guidance system is provided for sensing the relative orientation and line-of-sight distance of a pair of elements. The system includes a pair of distance sensing devices that sense the distance between each of two locations on the first element with respect to each of two corresponding locations on the second element. The apparatus can also include a motor for rotating one of the elements about an axis which extends half way between the two locations on that element, until the distances measured at the two locations are in a certain relationship such as equal to each other. Another set of distance measuring devices can be utilized to sense rotation about another axis perpendicular to the first axis, so that the elements can be oriented about both yaw and pitch axes.

The novel features of the invention are set forth with particularity in the appended claims. The invention will be best understood from the following description when read in conjunction with the accompanying drawings.

BRIEF DESCRIPTION OF THE DRAWINGS

FIG. 2 is a perspective view of a portion of the apparatus of FIG. 1, showing the claw and grappling fixture thereof, and the associated sensor arrangement.

FIG. 4 is an elevation view of a proximity sensor arrangement utilized in the apparatus of FIG. 2.

FIG. 6 is a schematic diagram of a sensor system constructed with another embodiment of the invention, which utilizes continuous range information from proximity sensors.

FIG. 7 is a partial perspective view of a sensor system constructed in accordance with another embodiment of the invention.

DESCRIPTION OF THE PREFERRED EMBODIMENTS

Figure 1:
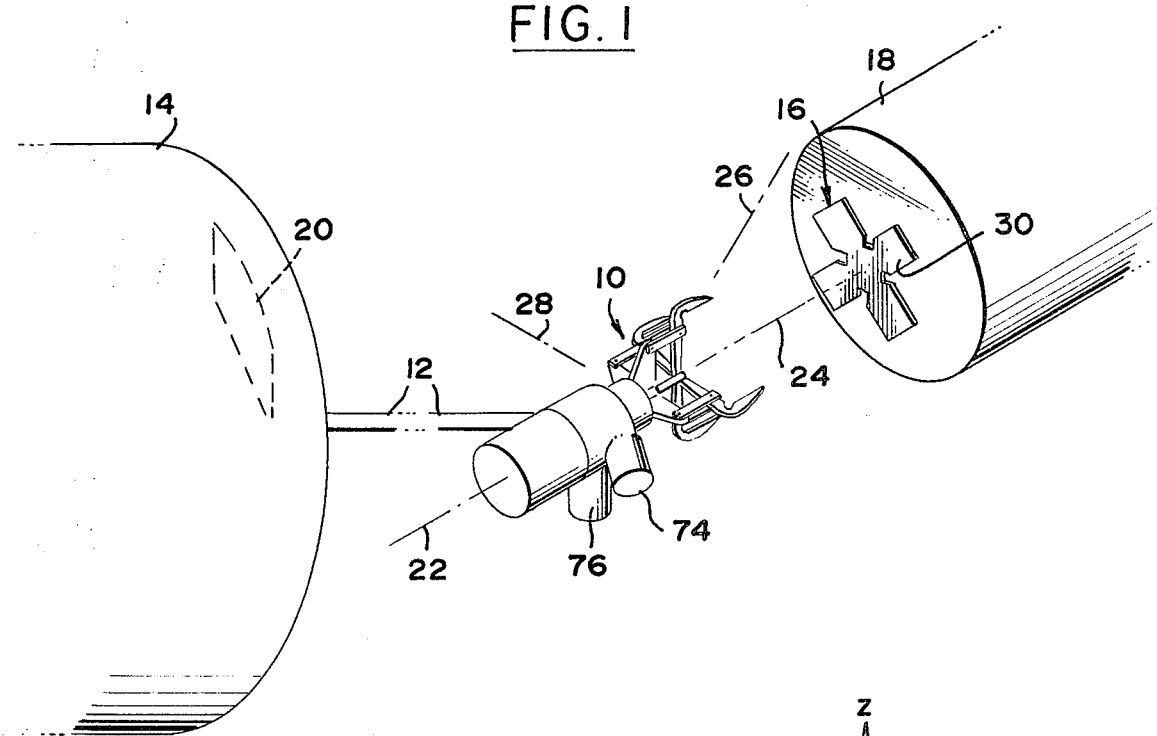
FIG. 1 is a perspective view of a space vehicle arrangement which utilizes a guidance system of the present invention to orient a claw with respect to a grappling fixture.

FIG. 1 illustrates an end effector or claw element 10 which lies at the end of a long articulated manipulator boom 12 extending from a space shuttle 14, and which has been deployed to engage a grappling fixture element 16 on a satellite 18. An operator in the shuttle craft 14 can view the elements through a window 20 or through a TV monitor, to operate the boom so as to position the claw element or claw 10 close to the grappling fixture element or fixture 16. One requirement for the claw 10 to properly grasp the fixture 16 is that the claw must be positioned with its roll axis 22 substantially in line with the axis 24 of the fixture, and the claw 10 must be rotated about the roll axis 22 to the proper position thereabout. Another requirement is that the claw must be oriented so it is not tilted about a yaw axis 26 or a pitch axis 28 that are both perpendicular to the roll axis 22. Still another requirement is that the claw mechanism must be within a given distance relative to the grappling fixture, that is, the top plane 30 of the grappling fixture must be within the grasp envelope of the claw mechanism. It is found that an operator can fairly easily determine when the roll axis 22 of the claw is in line with the axis of the fixture and the claw is in the proper rotational position about the axis 22, and in any case prior art mechanisms are available to sense this. However, difficulty is encountered in determining when the claw is at the proper terminal distance relative to the grappling fixture and when the claw is in the proper orientation with respect to the yaw and pitch axis 26, 28 with respect to the fixture. The present invention is directed largely to a system for sensing the orientation of the claw or other element about these axes, with respect to the fixture 16 or other element, as well as for sensing their distance apart.

FIG. 2 illustrates details of the claw 10 and of the grappling fixture 16 designed to be engaged by the claw. The claw includes four hooks 31-34 that have inner ends pivotally mounted on a plunger 36 and middle portions pivotally mounted on links 38 supported on a frame 40. When the plunger 36 is pulled up, the ends of the hooks 31-34 rotate in a downward and inward direction to grasp striker portions 41-44 of the fixture 16. As mentioned above, engagement of the elements 10, 16 can be accomplished by first orienting the roll axis 22 of the claw over the fixture and rotating the claw so the hooks are over the striker portions or strikers 41-44. It is then necessary to bring the claw mechanism to the proper distance from the grappling fixture and to orient the claw about a yaw axis 26 and about a pitch axis 28, to assure that all four hooks 31-34 will properly engage all four strikers.

In order to sense the distance between claw and grappling fixture and to sense the orientation of the claw about the yaw and pitch axes 26, 28, four sensor arrangements are provided, which include four proximity detectors 51-54 located on the claw 10. Each of the detectors is a proximity sensor which senses the distance to one of four pad areas or pads 61-64 that may be defined on the top plane 30 of the grappling fixture. For example, the two proximity sensors 51, 52 sense the distances $D_1$ and $D_2$ to locations on the top plane of the fixture. A comparison of these two distances $D_1$ and $D_2$ enables the guidance system to determine the orientation of the claw 10 about the yaw axis 26, which extends perpendicular to an imaginary line 55 connecting a pair of locations on the claw such as the locations of the sensors 51, 52. A comparison of the distances sensed by the other two sensors 53, 54 enables a determination of the orientation of the claw about the pitch axis 28. The distance between the claw mechanism and grappling fixture can be taken as the average of the four measured distances to four locations on the top plane of the fixture.

Figure 3:
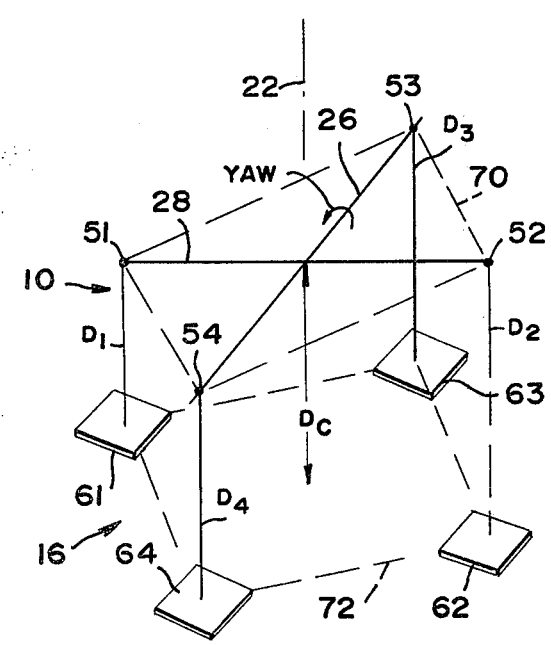
FIG. 3 is a schematic diagram of the arrangement of FIG. 2, showing the manner in which it operates when one element is rotated in yaw from a desired orientation.

FIG. 3 is a diagram of the claw 10 and fixture 16, in an orientation wherein the claw 10 is rotated by perhaps 20° from the proper orientation about the yaw axis 26. In this case, the sensor 51 will sense a distance $D_1$ which is less than the distance $D_2$ sensed by the sensor 52. The difference in the distances $D_1$ and $D_2$ can be utilized to determine the direction and amount of yaw. In particular, the yaw angle equals arc tan $[(D_1-D_2)/D]$, where D is the lateral distance between the two sensors 51 and 52 on the claw. A similar comparison of the distances $D_3$ and $D_4$ sensed by the sensors 53 and 54, can be utilized to determine rotation of the claw about the pitch axis 28.

In the apparatus of FIG. 3, the four sensors 51-54 are located at the four corners of an imaginary square 70 that lies in a plane that may be considered the plane of the claw 10. The four pads 61-64 lie at the corners of another square 72 which defines the top plane 30 of the grappling fixture 16. It may be noted that the square 72 on whose corners the pads 61-64 lie, is rotated 45° from a square on whose corners the middles of the strikers 41-44 lie. A purpose of the guidance system is to determine when the tow planes 70, 72 lie parallel to one another and are within a given distance relative to one another, which is when the hooks of the claw will be able to grasp all four strikers of the fixture. A variety of sensor devices can be utilized to sense distances. Where each of the distances $D_1$-$D_4$ is known quantitatively with reasonable precision, it is a relatively simple matter to turn the claw so as to make all four distances equal, and to move the claw towards or away from the fixture to a distance which enables engagement of the hooks with the strikers when the claw is closed. If the distances $D_1$-$D_4$ are not equal, the operator in the shuttle 14 of FIG. 1 can operate controls that energize motors such as 74 and 76 that respectively pivot the claw about the yaw and pitch axes 26, 28, and to bring the claw to the proper distance relative to the grappling fixture.

FIG. 4 illustrates a proximity sensor arrangement 80 which can be utilized to detect the distance between a sensor 51 thereof and the top plane of the grappling fixture. The sensor 51 includes a narrow light beam source 82 which directs a narrow light beam through a beamsplitter 84, so that a narrow circle of light 86 falls on the pad 61. The pad 61 has a diffuse colored surface. The sensor 51 includes a lens 88 that can form an image of the spot 86 onto a photocell 90. The narrow light beam from source 82 is infra-red, and a filter 92' is utilized to block visible light from reaching the cell 90. The total amount of infra-red light reaching the cell 90 is proportional to the square of the distance to the pad 61 over a considerable range, and the analog output of the cell 90 can be utilized to sense the distance to the pad. The output of the cell 90 is delivered to a distance indicating circuit 92 which senses the analog distance. The output of the circuit 92 is delivered to an orientation calculating circuit 94 which receives the outputs of the three other sensors 52-54. The circuit 94 has a pair of outputs 96, 98 which respectively indicate the amount and direction of yaw and pitch, of the claw with respect to the grappling fixture. These outputs can be utilized to directly control the motors 74, 76, or can be utilized in a display to indicate to the operator how the orientation of the claw must be changed.

Although the use of four proximity sensors provides a simple way to measure yaw and pitch, it is possible to make the measurements with only three of the sensors operating, and with the fourth such as 54 not operating. This can be accomplished, for example, by first determining the distance $D_c$ (FIG. 3) along the roll axis between the jaw and fixture elements, based upon the measurements $D_1$ and $D_2$, by the equality $$D_c=(D_1+D_2)/2$$

Then, $D_4$ can be calculated by the equation $$D_4=D_c-(D_3-D_c)$$

Another way of considering the situation is that the planes of the jaw and fixture elements are parallel when $D_1=D_2=D_3$. It is also possible to utilize three sensors angled about the roll axis 22, to measure tilting about predetermined yaw and pitch axes, regardless of the angular displacement (about the roll axis) between any of the sensors and the yaw and pitch axes. These schemes are readily implemented by employing a simple dedicated microcomputer.

Figure 5:
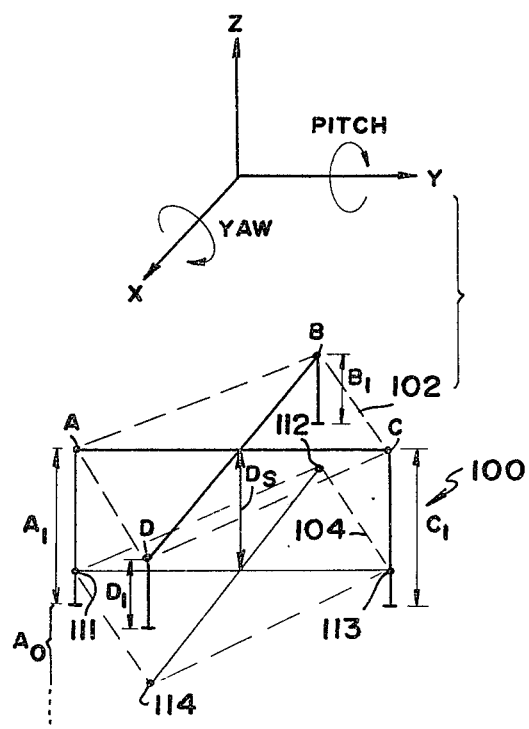
FIG. 5 is a schematic diagram showing a guidance system constructed in accordance with another embodiment of the invention, which utilizes binary interpretation of proximity sensor data.

Although proximity sensors are available which can indicate the precise distance between two locations on the elements within a wide range of distances, simpler proximity sensors can be utilized which sense only the binary states of "closer" or "further" than a predetermined distance. FIG. 5 illustrates a sensing system 100 which can be utilized with binary state proximity sensors, to determine when the plane 102 of a first element is parallel with the plane 104 of another element and with the planes spaced a predetermined distance $D_s$ apart. The first element has four binary treated sensors labelled A, B, C, and D that sense the distance to four corresponding locations 111-114 on the other element. When the sensor A senses the distance to location 111 to be less than a predetermined distance $A_1$, then sensor A generates the binary output "1," and when it senses the distance to be greater than this, i.e., in the range $A_o$, it generates the output "0." Similarly, the other binary sensors B, C, and D generate an output "1" only when the sensed distance is less than predetermined distances $B_1$, $C_1$, and $D_1$, respectively. By making the distances $A_1$ and $C_1$, at which the binary state changes for two of the sensors, greater than the distances $B_1$ and $D_1$ at which the binary states of the other sensors change, the system can detect when the elements are in proper orientation and position. The planes 102, 104 of the two elements are close to parallelism and close to a spacing $D_s$ apart when two of the sensors A and C generate a binary "1" indicating they are too close to the locations 111, 113, while both of the other sensors B and D generate binary "0" indicating they are too far from locations 112, 114. A table indicating the physical relationship between the two planes 102 and 104 of two elements, for each of 16 possible combinations of binary outputs of the elements A-D is provided below.

| PHYSICAL STATE | LOGIC STATE | | | |
|---|---|---|---|---|
| | A | B | C | D |
| SUCCESS | 1 | 0 | 1 | 0 |
| TOO FAR | 0 | 0 | 0 | 0 |
| TOO CLOSE | 1 | 1 | 1 | 1 |
| +YAW ERROR | 1 | 0 | 0 | 0 |
| +YAW ERROR | 1 | 1 | 0 | 1 |
| −YAW ERROR | 0 | 0 | 1 | 0 |
| −YAW ERROR | 0 | 1 | 1 | 1 |
| +PITCH ERROR | 0 | 0 | 0 | 1 |
| +PITCH ERROR | 1 | 0 | 1 | 1 |
| −PITCH ERROR | 0 | 1 | 0 | 0 |
| −PITCH ERROR | 1 | 1 | 1 | 0 |
| +YAW AND −PITCH ERRORS | 1 | 1 | 0 | 0 |
| −YAW AND −PITCH ERRORS | 0 | 1 | 1 | 0 |
| −YAW AND +PITCH ERRORS | 0 | 0 | 1 | 1 |
| +YAW AND +PITCH ERRORS | 1 | 0 | 0 | 1 |
| IMPOSSIBLE | 0 | 1 | 0 | 1 |

FIG. 6 illustrates a guidance system 120 which utilizes sensors E, F, G, and H of a tertiary type. That is, each sensor such as E on one element 126 can generate any one of three outputs, depending upon the distance to a corresponding location 121 on the grappling fixture or other element 128. The output of the sensor E is "2" when the distance lies within the range $E_2$, the output is "1" when the distance lies within range $E_1$, and the output is "0" when the distance is in the range $E_0$ (which indicates the distance is greater than a predetermined amount). There are $3^4 = 81$ combinations of the logic state of the four sensors, which indicate various physical states of the system, and these states are given in the table below:

| | PHYSICAL STATE | LOGIC STATE | | | |
|---|---|---|---|---|---|
| | | E | F | G | H |
| 1 | SUCCESS | 1 | 1 | 1 | 1 |
| 2 | TOO FAR | 0 | 0 | 0 | 0 |
| 3 | TOO CLOSE | 2 | 2 | 2 | 2 |
| 4 | | 1 | 0 | 0 | 0 |
| 5 | | 1 | 1 | 0 | 1 |
| 6 | | 2 | 1 | 1 | 1 |
| 7 | +YAW ERROR | 2 | 2 | 1 | 2 |
| 8 | | 2 | 0 | 0 | 0 |
| 9 | | 2 | 2 | 0 | 2 |
| 10 | | 2 | 0 | 1 | 0 |
| 11 | | 2 | 1 | 0 | 1 |
| 12 | | 1 | 2 | 0 | 2 |
| 13 | | 0 | 0 | 1 | 0 |
| 14 | | 0 | 1 | 1 | 1 |
| 15 | | 1 | 1 | 2 | 1 |
| 16 | | 1 | 2 | 2 | 2 |
| 17 | −YAW ERROR | 0 | 0 | 2 | 0 |
| 18 | | 0 | 2 | 2 | 2 |
| 19 | | 1 | 0 | 2 | 0 |
| 20 | | 0 | 1 | 2 | 1 |
| 21 | | 0 | 2 | 1 | 2 |
| 22 | | 0 | 0 | 0 | 1 |
| 23 | | 1 | 0 | 1 | 1 |
| 24 | | 1 | 1 | 1 | 2 |
| 25 | | 2 | 1 | 2 | 2 |

_-continued_

| | PHYSICAL STATE | LOGIC STATE | | | |
|---|---|---|---|---|---|
| | | E | F | G | H |
| 26 | +PITCH ERROR | 0 | 0 | 0 | 2 |
| 27 | | 2 | 0 | 2 | 2 |
| 28 | | 0 | 1 | 0 | 2 |
| 29 | | 1 | 0 | 1 | 2 |
| 30 | | 2 | 0 | 2 | 1 |
| 31 | | 0 | 1 | 0 | 0 |
| 32 | | 1 | 1 | 1 | 0 |
| 33 | | 1 | 2 | 1 | 1 |
| 34 | | 2 | 2 | 2 | 1 |
| 35 | −PITCH ERROR | 0 | 2 | 0 | 0 |
| 36 | | 2 | 2 | 2 | 0 |
| 37 | | 0 | 2 | 0 | 1 |
| 38 | | 1 | 2 | 1 | 0 |
| 39 | | 2 | 1 | 2 | 0 |
| 40 | | 1 | 0 | 0 | 1 |
| 41 | | 2 | 1 | 1 | 2 |
| 42 | | 2 | 0 | 0 | 2 |
| 43 | | 2 | 0 | 0 | 1 |
| 44 | +YAW AND +PITCH ERRORS | 2 | 0 | 1 | 1 |
| 45 | | 1 | 0 | 0 | 2 |
| 46 | | 1 | 1 | 0 | 2 |
| 47 | | 2 | 1 | 0 | 2 |
| 48 | | 2 | 0 | 1 | 2 |
| 49 | | 1 | 1 | 0 | 0 |
| 50 | | 2 | 2 | 1 | 1 |
| 51 | | 2 | 2 | 0 | 0 |
| 52 | | 2 | 1 | 0 | 0 |
| 53 | +YAW AND −PITCH ERRORS | 2 | 1 | 1 | 0 |
| 54 | | 1 | 2 | 0 | 0 |
| 55 | | 1 | 2 | 0 | 1 |
| 56 | | 2 | 2 | 1 | 0 |
| 57 | | 2 | 2 | 0 | 1 |
| 58 | | 0 | 1 | 1 | 0 |
| 59 | | 1 | 2 | 2 | 1 |
| 60 | | 0 | 2 | 2 | 0 |
| 61 | | 0 | 2 | 1 | 0 |
| 62 | −YAW AND −PITCH ERRORS | 0 | 2 | 1 | 1 |
| 63 | | 0 | 1 | 2 | 0 |
| 64 | | 1 | 1 | 2 | 0 |
| 65 | | 1 | 2 | 2 | 0 |
| 66 | | 0 | 2 | 2 | 1 |
| 67 | | 0 | 0 | 1 | 1 |
| 68 | | 1 | 1 | 2 | 2 |
| 69 | | 0 | 0 | 2 | 2 |
| 70 | | 0 | 0 | 2 | 1 |
| 71 | −YAW AND +PITCH ERRORS | 1 | 0 | 2 | 1 |
| 72 | | 0 | 0 | 1 | 2 |
| 73 | | 0 | 1 | 1 | 2 |
| 74 | | 1 | 0 | 2 | 2 |
| 75 | | 0 | 1 | 2 | 2 |
| 76 | | 1 | 0 | 1 | 0 |
| 77 | | 0 | 1 | 0 | 1 |
| 78 | | 2 | 1 | 2 | 1 |
| 79 | IMPOSSIBLE | 1 | 2 | 1 | 2 |
| 80 | | 2 | 0 | 2 | 0 |
| 81 | | 0 | 2 | 0 | 2 |

It may be noted that the sensor arrangement shown at 80 in FIG. 4 can be utilized as a tertiary sensor, by utilizing a photocell arrangement 90 which includes a central cell 130 and a ring cell 132 extending around it. When the distance to the spot 86 on the pad 61 is close to the desired distance, the entire image will be sharply focused on the center cell 130 and the ring cell 132 will have substantially zero output. When the spot 86 is much closer or further than a desired distance, both the center cell and ring cell 132 will be illuminated, but with the illumination being much lower when the spot is too far than when it is too close.

Referring again to FIG. 2, it may be noted that the sensor arrangement can be utilized not only to determine axial distance, yaw, and pitch, but also whether the elements are in proper rotational position about the roll axis 22 and whether their roll axes 22, 24 are aligned. This can be accomplished by selection of the width W and length L of the pads 61-64. If any of the four sensors 51-54 do not detect a spot on their corresponding pads 61-64, then this indicates an unacceptable rotational position or laterally shifted position (assuming no more than moderate roll or pitch). The width W of the pads (actually the circumferential length about the axis 24) or at least of a dull white (or some special retroreflector portion thereof), determines the range of rotation about the roll axis that will go undetected. The radial length L determines the range of misalignment that will go undetected. The values of W and L are chosen so that all four jaws can reliably engage all four strikers when no roll or misalignment error is detected.

It should be noted that all four sensors on an element, such as sensors 51-54, do not have to lie in the same plane so as to be equidistant from a point on the axis of the claw. However, each pair of sensors that are utilized to measure rotation about an axis, such as sensors 51 and 52 utilized to measure yaw, should lie on opposite sides of that axis or at least at different distances from it as viewed along the roll axis 22. In any case, circuitry is utilized which rotates the claw 10 about the yaw axis 26 which extends perpendicular (when viewed along the roll axis 22) to a line 28 connecting the sensors, to change the difference in distances $D_1$ and $D_2$ toward a predetermined value. The predetermined value of the difference distance is zero in the case where sensors such as 51 and 52 are equally distant from their respective pads 61, 62 at the desired orientation of the claw.

Thus, the invention provides a guidance system of relatively simple construction, which enables the orientation control of an element with respect to another element about both yaw and pitch axes, while also controlling their separation distance. This is accomplished by the use of proximity, or distance measuring, sensors that are spaced apart. At least three sensors measuring the distances between three pairs of locations on the elements, enable the determination of the orientation and distance of the elements. It is possible, for example, to utilize three elements located at the three points of an equilateral triangle, and in that case one element can be considered a sensor means and the other two elements considered to be the other sensor means in determining orientation about an axis that extends between the two sensor means. FIG. 7 shows such an arrangement, wherein three sensors 141-143 sense the distances to three pads 145-147. Although analog or multi-state distance measuring sensors can be utilized, it is also possible to utilize a limited number of binary distance measuring sensors to determine when a pair of elements are at the proper spacing and orientation about yaw and pitch axes.

Although particular embodiments of the invention have been described and illustrated herein, it is recognized that modifications and variations may readily occur to those skilled in the art and consequently, it is intended that the claims be interpreted to cover such modifications and equivalents.

The embodiments of the invention in which an exclusive property or privilege is claimed are defined as follows:

1. A guidance system comprising:
    a first element forming a claw having four hook means arranged substantially at the corners of a square;
    a second element forming a grappling fixture having four strikers with portions arranged substantially along the corners of a first square for engagement by said hook means;
    four distance sensing means for sensing the distance between each of four locations on said first element and each of four corresponding locations on said second element, the locations on said second element being arranged at the corners of a second square rotated about 45° from the orientation of said first square; and
    element turning means responsive to the difference in distance sensed by each pair of distance sensing means which correspond to the locations at opposite corners of said second square, for turning one of said elements about an axis which extends largely perpendicular to an imaginary line connecting the pair of opposite corners.

2. In a guidance system for orienting a first element in rotation about yaw and pitch axes with respect to a second element, the improvement of apparatus for detecting the relative rotational positions of the elements about the axes, comprising:
    a first pair of distance measuring sensors located on one of said elements, on either side of said yaw axis;
    a second pair of distance measuring sensors located on either side of a pitch axis that extends perpendicular to said yaw axis; and
    circuit means responsive to said sensors for generating a yaw indicating signal dependent upon the difference in the distances measured by said first sensors, and a pitch indicating signal dependent upon the difference in the distances measured by said second sensors;
    each sensor of said first and second pairs of sensors being constructed to generate a binary output of a level dependent upon whether the sensor senses a distance greater or less than a predetermined value; and
    said circuit means being constructed to generate a success indicating signal when both sensors of one pair have first binary outputs indicating sensed distances greater than the predetermined values for those sensors, while both sensors of the other pair have second binary outputs indicating sensed distances less than the predetermined values for those sensors.

3. In a guidance system for orienting a first element in rotation about yaw and pitch axes with respect to a second element, the improvement of apparatus for detecting the relative rotational positions of the elements, comprising:
    a pair of distance measuring sensors located on one of said elements, on either side of said yaw axis;
    a third distance measuring sensor located substantially along said yaw axis, as viewed along a roll axis extending between said elements; and
    circuit means responsive to said sensors for generating a yaw indicating signal dependent upon the difference in the distances measured by said pair of sensors, and a pitch indicating signal dependent upon the difference between the average distance measured by said pair of sensors and the distance measured by said third sensor.

4. In a guidance system for orienting one element in rotation about yaw and pitch axes that each extend perpendicular to a roll axis, with respect to another element, the improvement of apparatus for detecting the relative rotational positions of the elements about said yaw and pitch axes, comprising:

at least three distance measuring sensors angularly spaced about said roll axis of a first of said elements, each including a light emitter and a light sensor;

a plurality of light reflecting pads of predetermined width and length spaced about a predetermined roll axis of a second element, for directing some light received from a light emitting device back towards the device; and circuit means located on said first element and responsive to said sensors for generating yaw and pitch indicating signals dependent upon the differences in the distances measured by said sensors, when said sensors detect light reflected from said pads.

* * * * *